US008589002B1

(12) United States Patent
Henry et al.

(10) Patent No.: US 8,589,002 B1
(45) Date of Patent: Nov. 19, 2013

(54) METHODS AND SYSTEMS FOR ESTIMATING ENGINE FUEL CONSUMPTION

(75) Inventors: Luke Henry, Lawrence Park, PA (US); Sachin Shivajirao Kulkarni, Bangalore (IN); Nathan Yeager, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/561,144

(22) Filed: Jul. 30, 2012

(51) Int. Cl.
*F02D 41/34* (2006.01)

(52) U.S. Cl.
USPC .................................................. 701/19

(58) Field of Classification Search
USPC .................................................. 701/19
See application file for complete search history.

(56) References Cited

U.S. PATENT DOCUMENTS

| | | | |
|---|---|---|---|
| 4,050,295 A | 9/1977 | Harvey | |
| 4,437,342 A | 3/1984 | Hosaka et al. | |
| 4,475,380 A | 10/1984 | Colovas et al. | |
| 4,706,083 A | 11/1987 | Baatz et al. | |
| 4,845,630 A | 7/1989 | Stephens | |
| 5,652,378 A * | 7/1997 | Dussault | 73/114.52 |
| 5,960,765 A * | 10/1999 | Iida et al. | 123/295 |
| 6,032,637 A * | 3/2000 | Mamiya et al. | 123/295 |
| 6,401,703 B1 * | 6/2002 | Mamiya et al. | 123/674 |
| 6,464,026 B1 * | 10/2002 | Horsley et al. | 180/65.25 |
| 6,539,299 B2 * | 3/2003 | Chatfield et al. | 701/104 |
| 6,694,806 B2 | 2/2004 | Kumagai et al. | |
| 7,941,259 B2 * | 5/2011 | Tabata et al. | 701/54 |
| 8,423,273 B2 * | 4/2013 | Mineta | 701/123 |
| 2002/0175521 A1 * | 11/2002 | Dunsworth et al. | 290/40 A |
| 2009/0063028 A1 * | 3/2009 | Aitchison et al. | 701/113 |
| 2009/0171554 A1 * | 7/2009 | Yaguchi | 701/112 |
| 2009/0227407 A1 * | 9/2009 | Kamada et al. | 475/5 |
| 2010/0069196 A1 * | 3/2010 | Shibata et al. | 477/3 |
| 2010/0116235 A1 * | 5/2010 | Imamura et al. | 123/179.3 |
| 2011/0172897 A1 * | 7/2011 | Tsuzuki et al. | 701/103 |
| 2011/0246004 A1 * | 10/2011 | Mineta | 701/22 |
| 2011/0276212 A1 * | 11/2011 | Wu | 701/22 |
| 2012/0298085 A1 * | 11/2012 | Nose et al. | 123/676 |
| 2013/0079961 A1 * | 3/2013 | Kaifuku et al. | 701/22 |

* cited by examiner

*Primary Examiner* — Thomas Tarcza
*Assistant Examiner* — Alex C Dunn
(74) *Attorney, Agent, or Firm* — GE Global Patent Operation; John A. Kramer

(57) ABSTRACT

Various methods and systems are provided for estimating engine fuel consumption. In one example, a method comprises controlling an engine according to a control map, the control map specifying control settings according to a predetermined relationship with respect to engine speed and engine load. The method further comprises estimating fuel consumption of the engine based on each of: an electric-machine based engine load indicated by an electric machine coupled to the engine; and further based on the predetermined relationship.

19 Claims, 3 Drawing Sheets and systems for estimating fuel consumption of an engine. In one example, a method comprises controlling an engine according to a control map, the control map specifying control settings according to a predetermined relationship with respect to engine speed and engine load. The method further comprises estimating fuel consumption of the engine based on an electric-machine-based engine load indicated by an electric machine coupled to the engine and further based on the predetermined relationship. Controlling the engine may include determining a fuel injection amount based on the engine speed and load according to the predetermined relationship, for example. In some examples, the method may further comprise adjusting fuel injection timing of the engine based on an intake manifold temperature, ambient temperature, barometric pressure, or other factors. Once the fuel consumption is determined, information of the fuel consumption may be displayed to an operator of a vehicle in which the engine is positioned. In this way, the operator may receive a real time indication of fuel consumption with increased accuracy.

METHODS AND SYSTEMS FOR ESTIMATING ENGINE FUEL CONSUMPTION

FIELD

Embodiments of the subject matter disclosed herein relate to control of engines. Other embodiments relate to fuel consumption of the engine.

BACKGROUND

Fuel consumption of an engine may vary as operating conditions of the engine change. For example, fuel consumption may be affected by engine speed, load, and fuel injection parameters such as injection timing and injection amount. By knowing the fuel consumption during vehicle operation, driving may be performed more efficiently, for example, such that fuel economy is increased. In one example, real-time fuel consumption is estimated by integrating fuel quantity injected over time (e.g., a control system's estimate of fuel quantity injected per cycle multiplied by engine speed). If the control system's estimate of fuel quantity injected is not accurate, however, the fuel consumption estimate may not be accurate either. In another example, a fuel flow meter is added to the system; however, this increases a number of parts and cost of the system.

BRIEF DESCRIPTION

Thus, in one embodiment, a method includes controlling an engine according to a control map, the control map specifying control settings according to a predetermined relationship with respect to engine speed and engine load. The method further includes estimating fuel consumption of the engine based on each of: an engine load indicated by an electric machine coupled to the engine (e.g., an electric machine-based load); and the predetermined relationship.

In one embodiment, controlling the engine includes determining fuel injection parameters, such as timing and amount, based on the engine speed and load. For example, for each combination of speed and load, the injection parameters may be mapped such that they are known, and thus, have a predetermined relationship. Further, the electric-machine-based engine load indicated by the electric machine, such as an alternator, gives a direct measurement of power, independent of an engine control system. In this manner, a more accurate estimate of fuel consumption may be obtained without adding components to the engine system.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods

In some embodiments, a locomotive system may be used to exemplify one of the types of vehicles in which the engine is positioned. Other types of vehicles may include on-highway vehicles and off-highway vehicles other than locomotives or other rail vehicles, such as mining equipment and marine vessels. Other embodiments of the invention may be used for stationary engines. The engine may be a diesel engine, or may combust another fuel or combination of fuels. Such alternative fuels or combinations of fuels may include gasoline, kerosene, biodiesel, natural gas, and/or ethanol. Suitable engines may use compression ignition and/or spark ignition.

Figure 1:
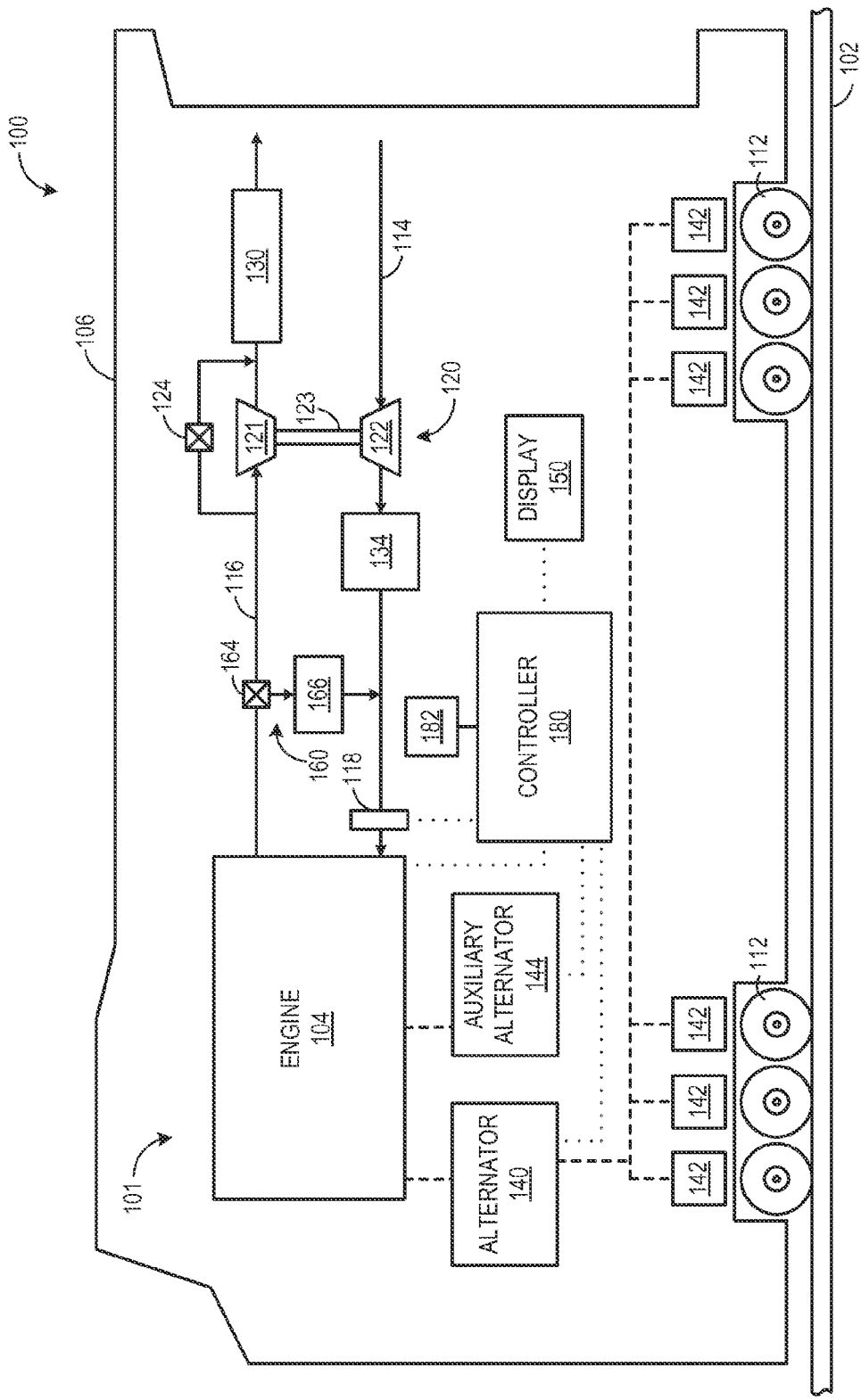
FIG. 1 shows a schematic diagram of an engine system, according to an embodiment.

FIG. 1 shows a block diagram of an exemplary embodiment of a vehicle system 100, herein depicted as a rail vehicle 106 (e.g., locomotive), configured to run on a rail 102 via a plurality of wheels 112. As depicted, the rail vehicle 106 includes an engine system 101 with an engine 104, such as an internal combustion engine.

The engine 104 receives intake air for combustion from an intake, such as an intake passage 114. The intake may be any suitable conduit or conduits through which gases flow to enter the engine. The intake passage 114 receives ambient air from an air filter (not shown) that filters air from outside of the vehicle 106 in which the engine 104 is positioned. Exhaust gas resulting from combustion in the engine 104 is supplied to an exhaust, such as an exhaust passage 116. The exhaust may be any suitable conduit through which gases flow from the engine. Exhaust gas flows through the exhaust passage 116 to an exhaust stack (not shown) and to the atmosphere, for example.

As depicted in FIG. 1, the engine system includes an exhaust gas recirculation (EGR) system 160, which routes exhaust gas from the engine 104 to the intake passage 114 of the engine 104, and not to the atmosphere. By introducing cooled exhaust gas to the engine 104, the amount of available oxygen for combustion is decreased, thereby reducing combustion flame temperatures and reducing the formation of nitrogen oxides (e.g., $NO_x$), for example. The EGR system 160 includes an EGR valve 164 to control the flow of exhaust gas from the engine 104 to the exhaust passage 116 and intake passage 114. The EGR valve 164 may be a hydraulically actuated valve, for example, such as a three way valve, a butterfly valve, or the like. In other examples, the EGR valve 164 may be an on/off valve or may control a variable amount of EGR. As depicted in the exemplary embodiment shown in FIG. 1, the EGR system 160 further includes a heat exchanger such as an EGR cooler 166 to reduce a temperature of (e.g., cool) the exhaust gas before the exhaust gas returns to the intake passage 114. The EGR cooler 166 may be an air-to-liquid heat exchanger, for example. In such an example, one or more charge air coolers 134 disposed in the intake passage 114 (e.g., upstream of where the recirculated exhaust gas enters) may be adjusted to further increase cooling of the charge air such that a mixture temperature of charge air and exhaust gas is maintained at a desired temperature.

In the exemplary embodiment depicted in FIG. 1, the EGR system 160 is a high-pressure EGR system which routes exhaust gas from a location upstream of a turbocharger 120 in the exhaust passage 116 to a location downstream of the turbocharger 120 in the intake passage 114. In other embodiments, the engine system 101 may additionally or alternatively include a low-pressure EGR system which routes exhaust gas from downstream of the turbocharger 120 in the exhaust passage 116 to a location upstream of the turbocharger 120 in the intake passage 114.

As depicted in FIG. 1, the engine system 101 further includes the turbocharger 120 arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 includes a turbine 121 and a compressor 122 which are mechanically coupled via a turbocharger shaft 123. In the exemplary embodiment shown in FIG. 1, the turbocharger 120 is provided with a wastegate 124, which is controllable for selectively bypassing exhaust gas around the turbocharger 120. (Wastegate refers to a valve or other element that is controllable for this purpose.) The wastegate 124 may be opened, for example, to divert the exhaust gas flow away from the turbine 121. In this manner, the rotating speed of the compressor 122, and thus the boost provided by the turbocharger 120 to the engine 104 may be regulated during steady state conditions. In other embodiments, the engine system 101 may include a two-stage turbocharger with a first turbocharger operating at a relatively higher pressure and a second turbocharger operating at a relatively lower pressure. In such an example, each of the turbochargers may be provided with a wastegate, or only the first or second turbocharger may be provided with a wastegate.

The engine system 101 further includes an exhaust treatment system 130 coupled in the exhaust passage in order to reduce regulated emissions. As depicted in FIG. 1, the exhaust gas treatment system 130 is disposed downstream of the turbine 121 of the turbocharger 120. In other embodiments, an exhaust gas treatment system may be additionally or alternatively disposed upstream of the turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

In other embodiments, the engine system may not include one or more of the EGR system, the exhaust gas treatment system, air-handling valves (e.g., EGR valve, wastegate, etc.), or a turbocharging system. For example, in one embodiment, the engine system includes a single stage turbocharger that does not include a wastegate, and the engine system does not include an EGR system or an exhaust gas treatment system.

Further, as depicted in FIG. 1, the vehicle system 100 includes an electric machine, such as an alternator 140 which is mechanically coupled to the engine 104. In other embodiments, the electric machine may be a generator or other suitable electric machine. For example, the engine 104 is a diesel engine that generates a torque output that is transmitted to the alternator 140. The alternator 140 produces electrical power that may be stored and applied for subsequent propagation to a variety of downstream electrical components. As an example, the alternator 140 may be electrically coupled to a plurality of traction motors 142 coupled to each of the wheels 112 of the vehicle 106, and the alternator 140 may provide electrical power to the plurality of traction motors 142. As depicted, the plurality of traction motors 142 are each connected to one of a plurality of wheels 112 to provide tractive power to propel the rail vehicle 106. The engine system 101 further includes an auxiliary alternator 144. The auxiliary alternator 144 may provide power to various components of the vehicle, such as lights, pump, air-conditioning, and the like. As will be described in greater detail below, the power output of the alternator 140 may be used to determine fuel consumption of the engine.

The vehicle system 100 further includes the control system 180, which is provided and configured to control various components related to the vehicle system 100. In one example, the control system 180 includes a computer control system. The control system 180 further includes non-transitory, computer readable storage media (not shown) including code for enabling on-board monitoring and control of engine operation. The control system 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control system 180 may receive signals from various engine sensors including, but not limited to, intake manifold temperature 118, engine speed, engine load, boost pressure, ambient pressure, exhaust temperature, exhaust pressure, etc. Correspondingly, the control system 180 may control the vehicle system 100 by sending commands to various components such as fraction motors, alternators, cylinder valves, throttle, heat exchangers, wastegates or other valves or flow control elements, etc. In some embodiments, the control system 180 may control the engine 102 according to a control map 182. "Control map" refers to a collection of at least partially interrelated data, usable for control purposes, and which may be stored electronically (such as in the aforementioned storage media) for automatic or other access by the control system. Thus, in embodiments, the control map 182 specifies control settings according to a predetermined relationship. As an example, the control system 180 may control fuel injection timing based on a predetermined relationship with respect to engine speed and engine load, as will be described in greater detail below.

As one example, the control system 180 may receive signals from the intake manifold temperature sensor 118 disposed in the intake passage 114 of the engine system 101. Based on the signals received indicating the intake manifold temperature, various engine operating parameters may be adjusted, as will be described in greater detail below with reference to FIGS. 2 and 3. For example, fuel injection timing, fuel injection amount, EGR amount, boost, and the like may be adjusted responsive to a change in the intake manifold temperature.

As another example, the control system 180 may control a fuel injection amount based on engine speed and load with a first relationship, and adjust a fuel injection timing of the engine 104 based on the intake manifold temperature with a second relationship. The control system 180 may be configured to estimate fuel consumption of the engine based on the fuel injection amount and timing, a measured alternator power, and the first and second relationships. Information of the fuel consumption may be displayed to an operator of the vehicle 106 on a display 150, for example, such as on a dashboard of the vehicle.

An embodiment relates to a method. The method comprises controlling an engine according to a control map, the control map specifying a first fuel injection parameter (e.g., injection amount) of an engine according to a first relationship with respect to engine speed and engine load, and adjusting a second fuel injection parameter (e.g., injection timing) of the engine according to a second relationship with respect to manifold temperature. The method further comprises measuring a power of an electric machine coupled to the engine estimating fuel consumption of the engine based on the first and second fuel injection parameters, the power of the electric machine (e.g., alternator power), and the first and second relationships. The method further comprises displaying the estimated fuel consumption to an operator of a vehicle in which the engine is positioned.

Another embodiment of a method comprises controlling an engine according to a set of control settings that specifies the control settings as a predetermined function of engine speed and engine load. The method further comprises estimating fuel consumption of the engine based on: the engine load indicated by an electric machine coupled to the engine; and the predetermined function.

Figure 2:
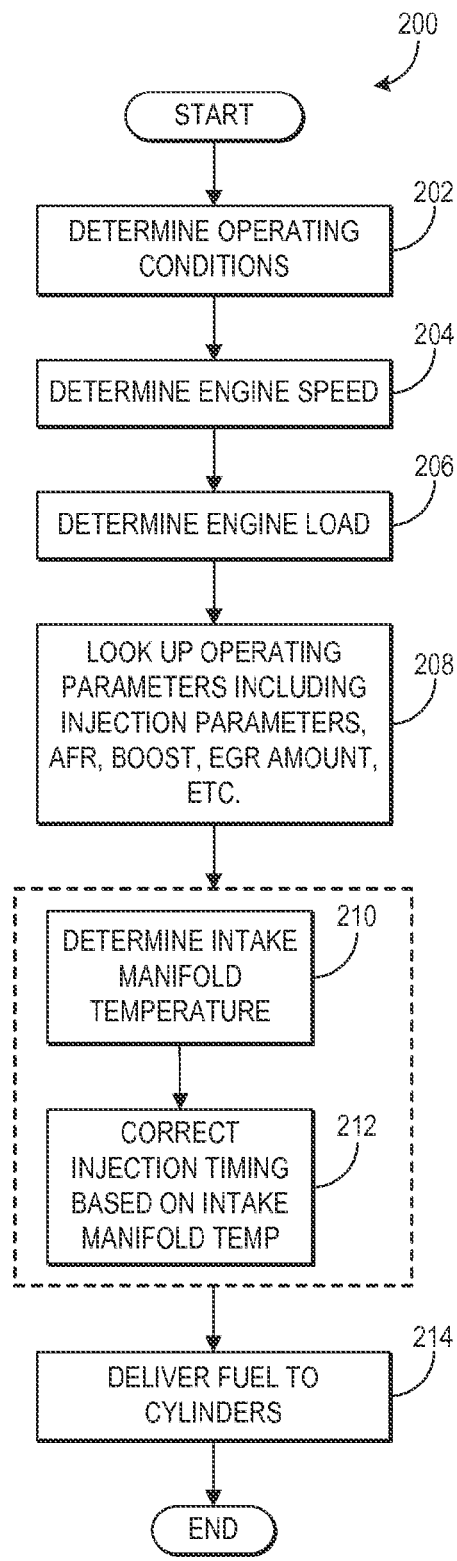
FIG. 2 shows a flow chart illustrating a method for controlling an engine, according to an embodiment.
Figure 3:
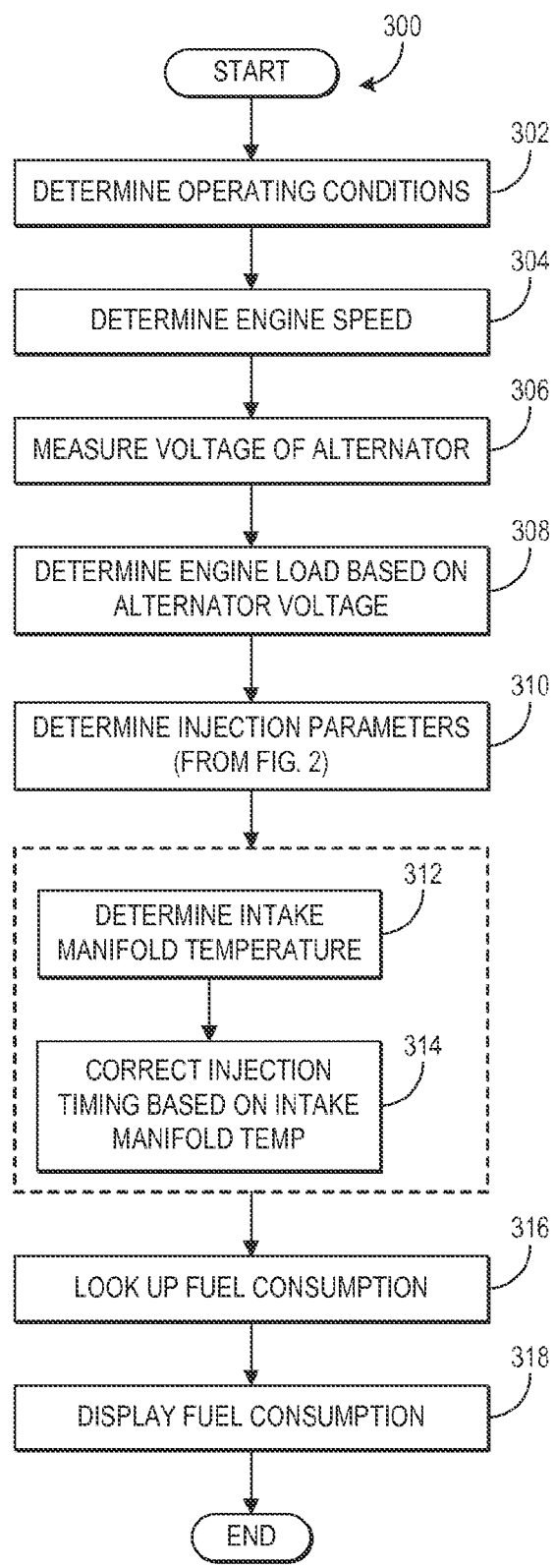
FIG. 3 shows a flow chart illustrating a method for estimating fuel consumption of an engine, according to an embodiment.

Examples of another embodiment of a method are shown in FIGS. 2 and 3, which show flow charts illustrating methods for an engine system, such as the engine system 101 described above with reference to FIG. 1. In particular, FIG. 2 shows a method for controlling the engine and FIG. 3 shows a method for estimating fuel consumption of the engine. The method of FIG. 3 may be carried out at the same time as the method of FIG. 2 such that it tracks the method of FIG. 2, for example.

Continuing to FIG. 2, a flow chart illustrating a method 200 for controlling an engine system, such as the engine system 101 described above with reference to FIG. 1, is shown. Specifically, the method determines engine speed and engine load and controls operating parameters based on the engine speed and load. For example, the engine speed and load may be inputs of a control map which describes several fuel injection parameters, for example, such as injection timing, common rail fuel pressure, number of injections, and the like. As such, for any engine speed and load, the fuel injection parameters are known.

At step 202, operating conditions are determined. As non-limiting examples, the operating conditions may include ambient temperature, ambient pressure, exhaust temperature, amount of $NO_x$ generation, and the like.

Once the operating conditions are determined, the engine speed is determined at step 204. For example, a speed sensor, such as a Hall effect sensor or other speed sensor, may be used to measure the speed of the engine. At step 206, the engine load is determined. In some examples, the engine load may be a parameter-based engine load. In other examples, the engine load may be an electric-machine-based engine load. In one example, the engine load may be determined as a brake power, for example.

During engine testing, for example, operating parameters may be determined and stored for each combination of engine speed and load (e.g., the operating parameters may be mapped with respect to engine speed and load). In this way, the engine may be controlled with a predetermined relationship with respect to engine speed and load. Thus, at step 208, operating parameters including fuel injection parameters (e.g., fuel injection amount, fuel injection timing), air fuel ratio (AFR), boost, EGR amount, turbocharger wastegate, etc. are looked up and determined based on control maps. In another example, the operating parameters may be determined based on empirically determined regression equations, for example.

In some embodiments, the operating parameters are determined based only on engine speed and load. In other embodiments, the operating parameters may be based on engine speed and load, which are then further adjusted based on an intake manifold temperature. Thus, at step 210, the intake manifold temperature is determined. The intake manifold temperature may be measured by an intake manifold temperature sensor disposed in the intake manifold, such as the intake manifold temperature sensor 118 described above with reference to FIG. 1, for example. At step 212, the injection timing and/or AFR are corrected based on the intake manifold temperature. In another example, only the injection timing is corrected based on the intake manifold temperature. For example, the injection timing may be advanced or retarded based on the measured intake manifold temperature. In such an embodiment, there are no other modifications to the injection timing. Thus, in one example embodiment, the fuel injection timing is determined based only on engine speed and load, and only modified based on the intake manifold temperature. In some examples, one or more other operating parameters may be adjusted based on the intake manifold temperature and only based on the intake manifold temperature. For example, an amount of EGR, boost, positions of various control elements (e.g., the turbocharger wastegate), and the like may be adjusted based on the intake manifold temperature once they are determined based on engine speed and load, and then further adjustments for ambient conditions may also be used, if desired. In other embodiments, other parameters may be used to adjust fuel injection parameters. Such parameters may include ambient temperature, barometric pressure, or the like, for example.

Once the fuel injection timing and amount have been determined, fuel is delivered to cylinders of the engine at step 214. For example, fuel is delivered to the cylinders with an injection timing and amount as determined at steps 208 and 212 of the method.

Thus, the engine may be controlled with a predetermined relationship with respect to engine speed and load. In one example, the predetermined relationship includes determining a fuel injection amount based on engine speed and load and adjusting fuel injection timing based on the intake manifold temperature. In another example, one or more other operating parameters may additionally be determined based on engine speed and load and adjusted based on the intake manifold temperature.

FIG. 3 shows a flow chart illustrating a method 300 for estimating fuel consumption of the engine. The method shown in FIG. 3 may be carried out at the same time as the method described above with reference to FIG. 2, such that it tracks the method shown in FIG. 2, for example.

At step 302, operating conditions are determined. As non-limiting examples, the operating conditions may include ambient temperature, ambient pressure, exhaust temperature, amount of $NO_x$ generation, and the like.

Once the operating conditions are determined, engine speed is determined at step 304. The engine speed may be determined via the same method and may be the same engine speed as determined at step 204 in FIG. 2. For example, the engine speed may be determined based on a speed sensor.

At step 306, a voltage of an alternator or other electric machine coupled to the engine, such as the alternator 140 described above with reference to FIG. 1, is measured. The alternator output voltage may be determined by measuring the voltage of the alternator, for example. In other examples, an output current of the alternator may be determined.

At step 308, engine load is determined based on alternator output (e.g., electric-machine-based engine load), such as the alternator voltage. As an example, the alternator voltage and resistance of the electrical load may be used by the control system to calculate the output power of the alternator.

At step 310, fuel injection parameters, such as injection timing and injection amount, are determined from step 208 in FIG. 2. For example, the fuel injection parameters may be determined from a map based on engine speed and load.

In some embodiments, the operating parameters determined based only on engine speed and load may be used. In other embodiments, the operating parameters based on engine speed and load may be adjusted based on an intake manifold temperature. Thus, at step 312, the intake manifold temperature is determined, such as at step 210 of FIG. 2. The intake manifold temperature may be measured by an intake manifold temperature sensor disposed in the intake manifold, such as the intake manifold temperature sensor 118 described above with reference to FIG. 1, for example. At step 314, the injection timing is corrected based on the intake manifold temperature. This injection timing correction is then used to correct the fuel consumption estimate for this operating condition. For example, the injection timing may be advanced or retarded based on the measured intake manifold temperature, thus respectively decreasing or increasing an actual fuel consumption of the engine. In such an embodiment, there are no other modifications to the injection timing. Thus, the fuel injection timing is determined based only on engine speed and load, and only modified based on the intake manifold temperature.

At step 316, the fuel consumption is estimated based on the engine load determined at step 306, the engine speed determined at step 308, and the fuel injection parameters determined at steps 310 or 314. For example, in one example, the fuel consumption may be estimated and output as a fuel rate (e.g., gallons per hour, grams per hour, liters per minute, or the like). In another example, the fuel consumption may be estimated and output as a brake specific fuel consumption (e.g., pounds per horsepower-hour, grams per joule, or the like).

Once the fuel consumption is estimated, the fuel consumption is displayed at step 318. The fuel consumption may be displayed on a display on a dashboard of a vehicle in which the engine is positioned, for example, such as the display 150 described above with reference to FIG. 1. In this manner, an operator of the vehicle may receive a real-time indication of the fuel consumption of the engine. In some examples, the fuel consumption may additionally or alternatively be sent to a control center which is monitoring operation of the vehicle. Further, in some examples, the fuel consumption may be used for engine control or diagnostics.

Thus, the fuel consumption of the engine may be estimated based on engine speed, load, and fuel injection parameters.

Once the fuel consumption is determined, information of the fuel consumption may be displayed to an operator of the vehicle in which the engine is positioned. As such, the operator may receive a real time estimate of the fuel consumption for engine control and/or diagnostics.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
controlling an engine according to a control map, the control map specifying control settings according to a predetermined relationship with respect to engine speed and engine load; and
estimating fuel consumption of the engine based on each of: an engine load indicated by an electric machine coupled to the engine; and the predetermined relationship.

2. The method of claim 1, wherein controlling the engine based on the control map includes determining a fuel injection timing based on the engine speed and load, and adjusting the fuel injection timing based on an intake manifold temperature.

3. The method of claim 1, further comprising outputting information of the fuel consumption as a brake specific fuel consumption.

4. The method of claim 1, further comprising outputting information of the fuel consumption as a fuel rate.

5. The method of claim 1, wherein the electric machine is an alternator.

6. The method of claim 5, further comprising measuring a voltage of the alternator to determine alternator power and the electric-machine-based engine load.

7. The method of claim 1, further comprising displaying information of the fuel consumption to an operator of a vehicle in which the engine is positioned.

8. The method of claim 7, wherein the vehicle is a locomotive.

9. A system, comprising:
an engine;

an electric machine mechanically coupled to the engine and configured to output a voltage;

a control system operable to: control the engine according to a control map which specifies control settings according to a predetermined relationship with respect to engine speed and engine load; estimate fuel consumption based on the voltage output by the electric machine and the predetermined relationship; and display information of the fuel consumption.

10. The system of claim 9, further comprising an intake manifold temperature sensor configured to measure an intake manifold temperature, and wherein the control system is further configured to adjust injection timing based on the intake manifold temperature.

11. The system of claim 9, wherein the system is positioned in a vehicle, and display of the information of the fuel consumption by the control system includes display of the information of the fuel consumption to an operator of the vehicle.

12. The system of claim 11, wherein the vehicle is a locomotive.

13. The system of claim 9, wherein the electric machine is an alternator, and the control system is further operable to calculate an engine-machine-based engine load based on the voltage output by the alternator.

14. A method, comprising:

controlling an engine according to a control map, the control map specifying a first fuel injection parameter of an engine according to a first relationship with respect to engine speed and engine load, and adjusting a second fuel injection parameter of the engine according to a second relationship with respect to manifold temperature;

measuring a power of an electric machine coupled to the engine;

estimating fuel consumption of the engine based on the first and second fuel injection parameters, the power, and the first and second relationships; and displaying the estimated fuel consumption to an operator of a vehicle in which the engine is positioned.

15. The method of claim 14, wherein the first fuel injection parameter is injection amount and the second fuel injection parameter is injection timing.

16. The method of claim 14, further comprising controlling air fuel ratio, boost, and amount of exhaust gas recirculation of the engine based on engine speed and engine load.

17. The method of claim 14, wherein displaying the estimated fuel consumption includes displaying a fuel rate.

18. The method of claim 14, wherein displaying the estimated fuel consumption includes displaying a brake specific fuel consumption.

19. A method, comprising:

controlling an engine according to a set of control settings that specifies the control settings as a predetermined function of engine speed and engine load; and estimating fuel consumption of the engine based on: the engine load indicated by an electric machine coupled to the engine; and the predetermined function.

* * * * *

UNITED STATES PATENT AND TRADEMARK OFFICE
CERTIFICATE OF CORRECTION

| | | |
|---|---|---|
| PATENT NO. | : 8,589,002 B1 | Page 1 of 1 |
| APPLICATION NO. | : 13/561144 | |
| DATED | : November 19, 2013 | |
| INVENTOR(S) | : Henry et al. | |

It is certified that error appears in the above-identified patent and that said Letters Patent is hereby corrected as shown below:

In the Specification

In Column 4, Line 48, delete "fraction motors," and insert -- traction motors, --, therefor.

Signed and Sealed this
Seventeenth Day of June, 2014

Michelle K. Lee
*Deputy Director of the United States Patent and Trademark Office*